(12) United States Patent
Moser et al.

(10) Patent No.: US 7,986,407 B2
(45) Date of Patent: Jul. 26, 2011

(54) METHOD AND APPARATUS USING VOLUME HOLOGRAPHIC WAVELENGTH BLOCKERS

(75) Inventors: Christophe Moser, Pasadena, CA (US); Frank Havermeyer, Arcadia, CA (US)

(73) Assignee: Ondax, Inc., Monrovia, CA (US)

( * ) Notice: Subject to any disclaimer, the term of this patent is extended or adjusted under 35 U.S.C. 154(b) by 277 days.

(21) Appl. No.: 12/315,470

(22) Filed: Dec. 3, 2008

(65) Prior Publication Data

US 2010/0027001 A1 Feb. 4, 2010

Related U.S. Application Data

(60) Provisional application No. 61/137,871, filed on Aug. 4, 2008.

(51) Int. Cl.
*G01J 3/44* (2006.01)
(52) U.S. Cl. .................................. 356/301; 359/15
(58) Field of Classification Search .................. 356/301; 359/15
See application file for complete search history.

(56) References Cited

U.S. PATENT DOCUMENTS

| | | |
|---|---|---|
| 3,588,254 A | 6/1971 | Rhoades |
| 3,588,738 A | 6/1971 | Goodwin |
| 3,659,947 A | 5/1972 | Neumann |
| 3,902,135 A | 8/1975 | Terada |
| 4,017,144 A | 4/1977 | Staebler |
| 4,057,408 A | 11/1977 | Pierson et al. |
| 4,103,254 A | 7/1978 | Chikami |
| 4,181,515 A | 1/1980 | Dyott |
| 4,456,328 A | 6/1984 | Arns |
| 4,794,344 A | 12/1988 | Johnson |
| 4,807,950 A | 2/1989 | Glenn |
| 4,824,193 A | 4/1989 | Maeda |
| 4,942,583 A | 7/1990 | Nazarathy |
| 5,042,898 A | 8/1991 | Morey |
| 5,107,365 A | 4/1992 | Ota |
| 5,221,957 A | 6/1993 | Jannson |
| 5,315,417 A | 5/1994 | Moss |
| 5,335,098 A | 8/1994 | Leyva |
| 5,388,173 A | 2/1995 | Glenn |
| 5,432,623 A | 7/1995 | Egan |
| 5,440,669 A | 8/1995 | Rakuljic |

(Continued)

FOREIGN PATENT DOCUMENTS

DE 4214014 11/1992

OTHER PUBLICATIONS

Askins, "Fiber Bragg refractors prepared by a single excimer pulse," Opt. Lett., vol. 17(11), pp. 833-835 (1992).

(Continued)

*Primary Examiner* — Layla Lauchman
(74) *Attorney, Agent, or Firm* — Carr & Ferrell LLP

(57) ABSTRACT

The invention disclosed here teaches methods to fabricate and utilize a non-dispersive holographic wavelength blocker. The invention enables the observation of the Raman signal near the excitation wavelength (~9 cm$^{-1}$) with the compactness of standard thin film/holographic notch filter. The novelty is contacting several individual volume holographic blocking notch filter (VHBF) to form one high optical density blocking filter without creating spurious multiple diffractions that degrade the filter performance. Such ultra-narrow-band VHBF can be used in existing compact Raman instruments and thus will help bring high-end research to a greater number of users at a lower cost.

18 Claims, 12 Drawing Sheets

U.S. PATENT DOCUMENTS

| | | | |
|---|---|---|---|
| 5,491,570 | A | 2/1996 | Rakuljic |
| 5,517,525 | A | 5/1996 | Endo |
| 5,594,744 | A | 1/1997 | Lefevre |
| 5,625,453 | A | 4/1997 | Matsumoto |
| 5,636,304 | A | 6/1997 | Mizrahi |
| 5,640,256 | A | 6/1997 | De Vre |
| 5,684,611 | A | 11/1997 | Rakuljic et al. |
| 5,691,989 | A | 11/1997 | Rakuljic et al. |
| 5,771,250 | A | 6/1998 | Shigehara |
| 5,796,096 | A | 8/1998 | Rakuljic |
| 5,844,700 | A | 12/1998 | Jeganathan |
| 5,917,648 | A | 6/1999 | Harker |
| 5,943,128 | A * | 8/1999 | Slater ............................ 356/301 |
| 5,960,133 | A | 9/1999 | Tomlinson |
| 5,966,391 | A | 10/1999 | Zediker |
| 6,049,554 | A | 4/2000 | Lang |
| 6,100,975 | A | 8/2000 | Smith |
| 6,101,301 | A | 8/2000 | Engelberth |
| 6,139,146 | A | 10/2000 | Zhang |
| 6,147,341 | A | 11/2000 | Lemaire |
| 6,169,829 | B1 | 1/2001 | Laming |
| 6,192,062 | B1 | 2/2001 | Sanchez-Rubio |
| 6,211,976 | B1 | 4/2001 | Popovich |
| 6,221,535 | B1 | 4/2001 | Cox |
| 6,226,084 | B1 | 5/2001 | Tormod |
| 6,249,624 | B1 | 6/2001 | Putnam |
| 6,281,974 | B1 | 8/2001 | Scheiner |
| 6,304,687 | B1 | 10/2001 | Inoue |
| 6,327,283 | B1 | 12/2001 | Hung |
| 6,327,292 | B1 | 12/2001 | Sanchez-Rubio |
| 6,339,609 | B2 | 1/2002 | Lefevre |
| 6,356,684 | B1 | 3/2002 | Patterson |
| 6,363,187 | B1 | 3/2002 | Fells |
| 6,370,310 | B1 | 4/2002 | Jin |
| 6,396,982 | B1 | 5/2002 | Lin |
| 6,414,973 | B1 | 7/2002 | Hwu |
| 6,449,097 | B1 | 9/2002 | Zhu |
| 6,498,872 | B2 | 12/2002 | Bouevitch |
| 6,498,891 | B1 | 12/2002 | Montesanto |
| 6,507,693 | B2 | 1/2003 | Maron |
| 6,512,618 | B1 | 1/2003 | Heflinger |
| 6,568,220 | B1 | 5/2003 | Paek |
| 6,586,141 | B1 | 7/2003 | Efimov |
| 6,587,180 | B2 | 7/2003 | Wang |
| 6,606,152 | B2 | 8/2003 | Littau |
| 6,621,957 | B1 | 9/2003 | Sullivan |
| 6,628,862 | B1 | 9/2003 | Yao |
| 6,670,079 | B1 | 12/2003 | Kitamura |
| 6,673,497 | B2 | 1/2004 | Efimov |
| 6,714,309 | B2 | 3/2004 | May |
| 6,750,996 | B2 * | 6/2004 | Jagt et al. ........................ 359/34 |
| 6,768,577 | B2 | 7/2004 | Eggleton et al. |
| 6,788,849 | B1 | 9/2004 | Pawluczyk |
| 6,822,218 | B2 | 11/2004 | Helmig |
| 6,828,262 | B2 | 12/2004 | Borrelli |
| 6,829,067 | B2 | 12/2004 | Psaltis |
| 6,844,946 | B2 | 1/2005 | Buse |
| 6,847,763 | B2 | 1/2005 | Eggleton |
| 6,879,441 | B1 | 4/2005 | Mossberg |
| 6,904,200 | B2 | 6/2005 | Wang |
| 6,934,060 | B2 * | 8/2005 | Psaltis ............................ 359/15 |
| 6,987,907 | B2 | 1/2006 | Psaltis |
| 6,992,805 | B2 | 1/2006 | Ingwall |
| 7,002,697 | B2 | 2/2006 | Domash |
| 7,031,573 | B2 | 4/2006 | Volodin |
| 7,081,977 | B2 | 7/2006 | Kim |
| 7,081,978 | B2 | 7/2006 | Chen |
| 7,125,632 | B2 | 10/2006 | Volodin |
| 7,136,206 | B2 | 11/2006 | Psaltis |
| 7,173,950 | B2 | 2/2007 | Hand |
| 7,212,554 | B2 | 5/2007 | Zucker |
| 7,245,369 | B2 * | 7/2007 | Wang et al. ................... 356/301 |
| 7,245,407 | B2 | 7/2007 | Komma |
| 7,248,617 | B2 | 7/2007 | Volodin |
| 7,248,618 | B2 | 7/2007 | Volodin |
| 7,273,683 | B2 | 9/2007 | Volodin |
| 7,298,771 | B2 | 11/2007 | Volodin |
| 7,355,768 | B1 | 4/2008 | Billmers |
| 7,359,046 | B1 | 4/2008 | Steckman |
| 7,359,420 | B2 | 4/2008 | Shchegrov |
| 7,372,565 | B1 | 5/2008 | Holden |
| 7,391,703 | B2 | 6/2008 | Volodin |
| 7,397,837 | B2 | 7/2008 | Volodin |
| 7,477,818 | B2 | 1/2009 | Volodin |
| 7,483,190 | B2 | 1/2009 | Psaltis |
| 7,528,385 | B2 | 5/2009 | Volodin |
| 7,542,639 | B2 | 6/2009 | Moser |
| 7,545,844 | B2 | 6/2009 | Volodin |
| 7,548,313 | B2 * | 6/2009 | Nguyen ........................ 356/328 |
| 7,570,320 | B1 | 8/2009 | Anderson |
| 7,590,162 | B2 | 9/2009 | Volodin |
| 7,605,911 | B2 | 10/2009 | Wieloch |
| 7,633,985 | B2 | 12/2009 | Volodin |
| 7,636,376 | B2 * | 12/2009 | Moser et al. .................... 372/20 |
| 7,639,718 | B1 | 12/2009 | Moser |
| 7,667,882 | B2 | 2/2010 | Adibi |
| 7,697,589 | B2 | 4/2010 | Volodin |
| 7,719,675 | B2 | 5/2010 | Grygier |
| 7,746,480 | B2 | 6/2010 | Ozcan |
| 7,792,003 | B2 | 9/2010 | Volodin |
| 7,796,673 | B2 | 9/2010 | Volodin |
| 7,817,888 | B2 | 10/2010 | Volodin |
| 2001/0050751 | A1 | 12/2001 | Banyai |
| 2002/0015376 | A1 | 2/2002 | Liu |
| 2002/0045104 | A1 | 4/2002 | Efimov |
| 2002/0093701 | A1 | 7/2002 | Zhang |
| 2002/0141063 | A1 | 10/2002 | Petrov |
| 2002/0154315 | A1 | 10/2002 | Myrick |
| 2002/0181035 | A1 | 12/2002 | Donoghue |
| 2003/0007202 | A1 | 1/2003 | Moser |
| 2003/0011833 | A1 | 1/2003 | Yankov |
| 2003/0072336 | A1 | 4/2003 | Senapati |
| 2003/0128370 | A1 | 7/2003 | De Lega |
| 2003/0156607 | A1 | 8/2003 | Lipson |
| 2003/0169787 | A1 | 9/2003 | Vurgaftman |
| 2003/0190121 | A1 * | 10/2003 | Luo et al. ........................ 385/37 |
| 2003/0210863 | A1 | 11/2003 | Myers |
| 2003/0231305 | A1 | 12/2003 | Zeng |
| 2004/0021920 | A1 | 2/2004 | Psaltis |
| 2004/0165639 | A1 | 8/2004 | Lang |
| 2004/0191637 | A1 | 9/2004 | Steckman |
| 2004/0253751 | A1 | 12/2004 | Salnik |
| 2004/0258356 | A1 | 12/2004 | Brice |
| 2005/0018743 | A1 | 1/2005 | Volodin |
| 2005/0129072 | A1 | 6/2005 | Tayebati |
| 2005/0206984 | A1 | 9/2005 | Kawano |
| 2005/0226636 | A1 | 10/2005 | Hiramatsu |
| 2005/0248819 | A1 | 11/2005 | Hymel |
| 2005/0248820 | A1 * | 11/2005 | Moser et al. .................... 359/15 |
| 2005/0270607 | A1 | 12/2005 | Moser |
| 2006/0029120 | A1 | 2/2006 | Mooradian |
| 2006/0098258 | A1 | 5/2006 | Chen |
| 2006/0114955 | A1 | 6/2006 | Steckman |
| 2006/0156241 | A1 | 7/2006 | Psaltis |
| 2006/0251143 | A1 | 11/2006 | Volodin |
| 2006/0256830 | A1 | 11/2006 | Volodin |
| 2006/0280209 | A1 | 12/2006 | Treusch |
| 2007/0047608 | A1 | 3/2007 | Volodin |
| 2007/0160325 | A1 | 7/2007 | Son |
| 2010/0103489 | A1 | 4/2010 | Moser |
| 2010/0110429 | A1 | 5/2010 | Simoni |
| 2010/0149647 | A1 | 6/2010 | Figueroa |

OTHER PUBLICATIONS

Bochove, E.J. et al. "Theory of Spectral Beam Combining of Fiber Lasers," IEEE J. Quant. Elec., 38:5 (2002).

Burr, Geoffrey et al. "Angle and Space Multiplexed Holographic Storage Using the 90 degree Geometry," Optics Comm. 117 (1995).

Curtis, Kevin et al. "Cross Talk for Angle- and Wavelength-Multiplexed Image Plane Holograms," Optics Letters. vol. 19 (21) (1994).

Daneu, V. et al. "Spectral Beam Combining of a Broad-Stripe Diode Laser Array in an External Cavity," Opt. :ett. 25:6 (2000).

Dos Santos, Paulo et al. "Interference-term Real-time Measurement for Self-stablized Two-wave Mixing in Photorefractive Crystals," Optics Letters, Nov. 1988, vol. 13, No. 11, pp. 1014-1016.

Ford, Joseph et al. "Wavelength Add-Drop Switching Using Tilting Micromirrors," Journal of Lightwave Technology, vol. 17, No. 5 (May 1999).

Frejlich, Jamie et al. "Analysis of an Active Stablization System for a Holographic Setup," Applied Optics, May 15, 1988, vol. 27, No. 10, pp. 1967-1976.

Goodman, Joseph W. "Introduction to Fourier Optics," 1968, pp. 198-224.

Havermeyer, Frank et al. "Volume Holographic Grating-Based Continuously Tunable Optical Filter," Opt. Eng. 43(9), Sep. 2004, pp. 2017-2021.

Heaney et al., "Sol-gel derived photosensitive germanosilicate glass monoliths," Opt. Lett., vol. 25(24), pp. 1765-1767 (Dec. 2000).

Hill, "Photosensitivity in optical fiber waveguides: Application to reflection filter fabrication," Appl. Opt. Lett. vol. 32(10), pp. 647-649 (1978).

Hill, "Simple Transient Holograms in Ruby," Appl. Opt., vol. 10(7), pp. 1695-1697 (1971).

In re Rose, 220 F.2d 459, 105 USPQ 237-241 (CCPA 1955).

Kogelnik, Herwig. "Coupled Wave Theory for Thick Hologram Gratings," The Bell System Tech. Journal, Nov. 1969, vol. 48, No. 9, pp. 2909-2947.

Levene, Michael et al. "Method for Controlling the Shift Invairance of Optical Correlators," Applied Optics, Jan. 10, 1999, vol. 38, No. 2, pp. 394-398.

Li, Lijun et al. "Experimental Studies on Narrow-Linewidth YB3-+-Doped Double-Clad Fiber-Laser Cavities Based on Double-Clad Fiber Bragg Gratings," Microwave and Optical Technology Letters, 44(1):53-56 (2005).

Littman, Michael G. "Singlemode Operation Grazing-Incidence Pulsed Dye Laser," Optics Letters, Oct. 1978, vol. 3, pp. 138-140.

Mill, P. "Single Mode Operation of a 1.55 Micrometer Semi-conductor Lasers Using a Volume Holographic Grating," Jul. 1985, Electronics Letters.

Mitchard, Gordon et al. "Double-Clad Fibers Enable Lasers to Handle High Power," Laser Focus World. Jan. 1999.

Miyazaki, T. et al. "Nd-Doped Double-Clad Fiber Amplifier at 1.06um," Journal of Lightwave Technology, 16(4): 562-566 (Apr. 1998).

Moser, Christophe. "Folded Shift Multiplexing," Optics Letters, vol. 28 (11) (Jun. 2003).

Sadot, D. et al. "Tunable Optical Filters for Dense WDM Networks," IEEE Communications Magazine, 50-55 (1998).

Saleh, B. and M. Teich, "Fundamentals of Photonics," Wiley-Interscience, p. 151, 631-632 (1991).

Smith, Warren. "Modern Optical Engineering," 1990, pp. 43-47.

Steckman, Gregory J. et al. "Holographic Data Storage in Phenanthrenequinone Doped PMMA," SPIE Photonics West, San Jose, CA (Jan. 27, 1999).

Steckman, Gregory J. et al. "Holographic Multiplexing in Photorefractive Polymers," Optics Communications, Nov. 1, 2000, 185, pp. 13-17.

Steckman, Gregory J. et al. "Storage Density of Shift-Multiplexed Holographic Memory," Applied Optics, Jul. 10, 2001, vol. 40, No. 20, pp. 3387-3394.

Venus, George et al. "Semiconductor 1.7 W Volume Bragg Laser with Divergence Close to a Diffraction Limit," 26th Annual Conference on Lasers and Electro-Optics. CLEO/IQES and PhAST Technical Digest, Paper Code CFG4, Long Beach, CA, May 2006.

Volodin, B.L. et al. "Wavelength Stabilization and Spectrum Narrowing of High-Power Multimode Laser Diodes and Arrays by Use of Volume Bragg Gratings," Optics Letters, vol. 29, No. 16 (Aug. 15, 2004).

Yiou, Silvie et al. "Improvement of the Spatial Beam Quality of Laser Sources with an Intracavity Bragg Grating," Opt. Lett, 28 (4), 242 (2003).

Zorabedian, Paul. "Tunable Lasers Handbook—tunable external-davity semi-conductor lasers," Chapter 8, Academic Press (1995).

Bosomworth et al. "Thick holograms in photochromic material" Applied Optics [Online] 1968, 7(1), Abstract.

Erdei et al. "Optimization method for the design of beam shaping systems" Optical Engineering [Online] 2002, 41, Abstract.

Shu et al. "More on analyzing the reflection of a laser beam by a deformed highly reflective volume Bragg grating using iteration of the beam propagation method" Applied Optics [Online] 2009, 48 (1), pp. 22-27.

* cited by examiner

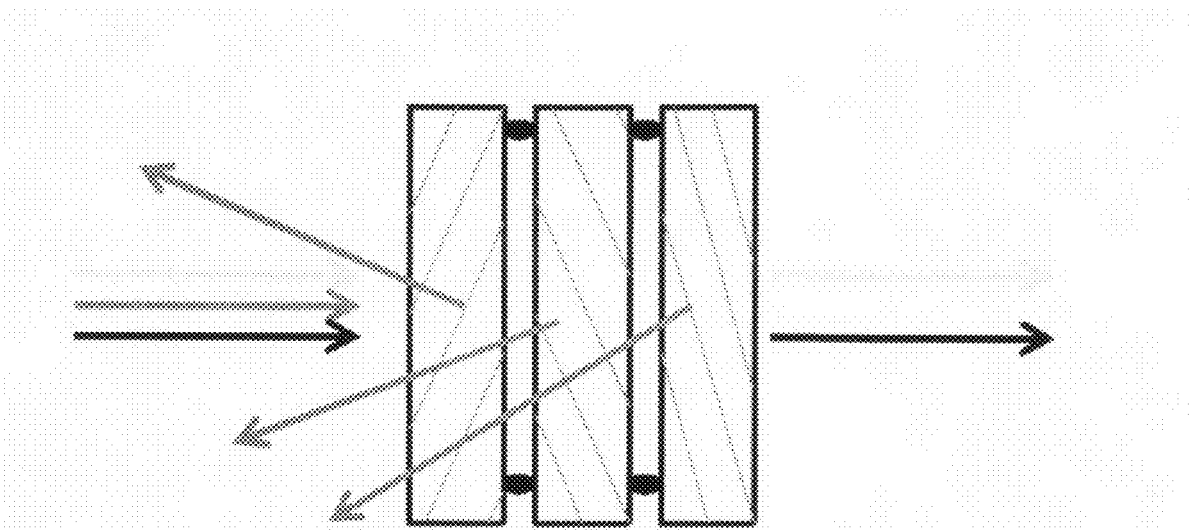
FIG 2A
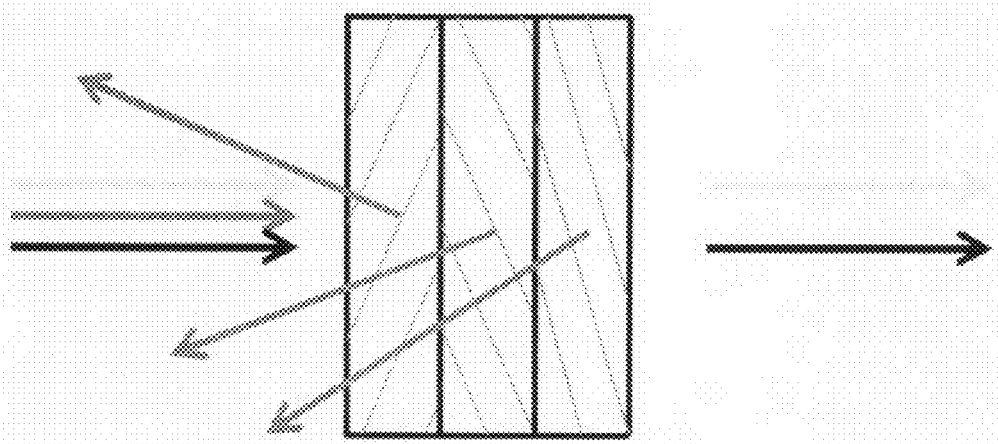
FIG 2B
Figure 2

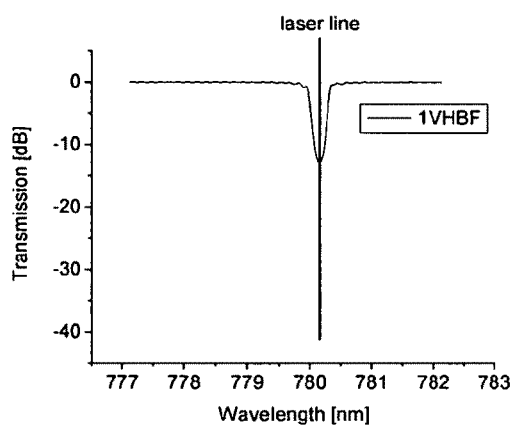 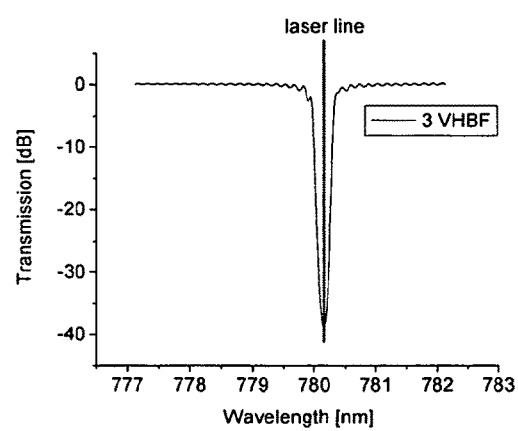
FIG 5A  FIG 5B
Figure 5

METHOD AND APPARATUS USING VOLUME HOLOGRAPHIC WAVELENGTH BLOCKERS

RELATED APPLICATION

This patent application claims priority to provisional patent application 61/137,871 filed on Aug. 4, 2008 and incorporated by reference herein in its entirety.

BACKGROUND OF THE INVENTION

1. Field of the Invention

The present invention relates to a method and apparatus for fabricating and using volume holographic wavelength blockers of high optical density and narrow bandwidth. Wavelength blockers are used to attenuate the signal of a pump source such as lasers while letting a scattering signal such as but not limited to fluorescence or Raman to go through. Thick reflective volume holographic elements (>typ. 0.1 mm thickness) have narrow rejection band but have limited attenuation of the order of optical density of 1 to 2. It is desirable to have a narrow spectral band rejection in conjunction with high attenuation reaching at least an optical density 6 for Raman spectroscopy for example.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Wavelength blockers, also called notch rejection filters, are an essential component in Raman and fluorescence instruments. The purpose of the wavelength blocker is to greatly attenuate the backscattered light from the laser illuminating a sample under test, while letting the faint Raman spectrally shifted signature pass through. Two non-dispersive filter technologies are currently used for the wavelength blocker: holographic and thin film. Commercial holographic notch filter technology uses holographic recording in a thin film of dichromated gelatin to produce a notch filter with 3 dB bandwidth of 350 $cm^{-1}$ and optical density of 6. Commercial thin film technology uses deposition of many layers to obtain a 3 dB bandwidth of approximately 600 $cm^{-1}$ and optical density of 6. Both technologies provide a compact size wavelength blocker element with a 10 mm aperture diameter and several millimeters thickness. However both notch filter technologies are limited to observing Raman spectral shift above approximately 350 $cm^{-1}$.

The Raman signal in the low frequency shift region, i.e near the frequency of the excitation laser, contains critical information about the molecular structure. For example carbon nanotubes exhibit vibration modes in the range of 150 $cm^{-1}$ to 200 $cm^{-1}$ depending on their size. Relaxation in liquids, solutions and biological samples exhibit Raman shift in the range between 0 and 400 $cm^{-1}$. U.S. Pat. Nos. 5,684,611 and 5,691,989 describe the use of reflective volume holographic filters (VHG) with millimeters thickness as filters producing 3 dB bandwidth of the order of 10 $cm^{-1}$. VHGs produced in a glass material are now commercially available and show long lifetime, high efficiency and excellent transmission in the red and near infrared. The photosensitive glass can contain for example silicon oxide, aluminum oxide and zinc oxide, fluorine, silver, chlorine, bromine and iodine, cerium oxide. Composition and processes for manufacturing the photosensitive glass are described in U.S. Pat. No. 4,057,408, the disclosure of which is incorporated herein by reference.

Large area (30×30 mm) reflective VHGs are restricted to the millimeter range thickness due to the material absorption. The optical density (O.D) achievable is therefore limited to O.D near unity (i.e ~90% efficiency) with thickness of 1.5 mm and transmission of 97 to 98% away from the notch in the near infrared.

By carefully individually aligning a cascade of VHGs, researchers have shown that the optical density can be added up: a cascade of 4 VHGs with each exhibiting an optical density of one yields a compounded notch with an optical density of 4. Commercial instruments comprising individual alignment fixtures for each VHG exhibit an optical density ranging from 4 to 6 with bandwidth of 10 $cm^{-1}$. However, there are several drawbacks to this approach:

1. The alignment procedure is complicated and required for each VHG separately.
2. The footprint is large (~100 $cm^3$) and as such not suitable to replace standard notch filters in existing Raman instruments.
3. The surface of each VHG contributes to Fresnel reflection loss.
4. Upon rotation of the assembly, the individual VHGs spectrally shift at different rates, thus reducing severely the optical density and broadening the overall blocker bandwidth.

The technology utilized to observe the Raman signal close to the laser excitation (>9 $cm^{-1}$) is based on cascading dispersive spectrometers. The cascaded spectrometers are bulky (~1 $m^2$), expensive (~$100K) and of moderate transmission (~50%).

SUMMARY OF THE INVENTION

The invention disclosed here teaches methods to fabricate and utilize a non-dispersive holographic wavelength blocker to overcome all the limitations outlined above. The invention enables the observation of the Raman signal near the excitation wavelength (~9 $cm^{-1}$) with the compactness of standard thin film/holographic notch filter. The novelty is contacting several individual volume holographic blocking notch filter (VHBF) to form one high optical density blocking filter without creating the spurious multiple diffractions that yield unacceptable rejection ratios. Such ultra-narrow-band VHBF can be used in existing compact Raman instruments and thus will help bring high-end research to a greater number of users at a lower cost.

BRIEF DESCRIPTION OF THE DRAWINGS

These and other features, aspects and advantages of the present invention will become better understood with regard to the following description, appended claims and accompanying drawings where:

FIG. 2A, 2B: Illustration of stacked reflective VHBF assembly.

FIG. 5A, 5B: Spectral response of a VHBF assembly showing addition of optical densities.

DETAILED DESCRIPTION OF THE INVENTION

In the following description of the present invention, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The notch wavelength $\lambda_B$ of a reflective VHG is characterized by the grating period $\Lambda$ and the angle of incidence $\Theta$ of the collimated illumination on the grating planes:

$$\lambda_B = \lambda_o \cdot \cos(\Theta), \quad (1)$$

where $\lambda_o = 2 \cdot n \cdot \Lambda$ is the anti-parallel diffraction wavelength where n the index of refraction. Identical reflection VHGs, i.e. VHGs characterized by the same grating period $\Lambda$ and incidence angle $\Theta$ cannot simply be stacked since the diffracted beams will fulfill the Bragg condition for other VHGs in the stack. Double diffraction on individual VHGs will cause interference effects and prevent the optical density values to be simply added.

Figure 1:
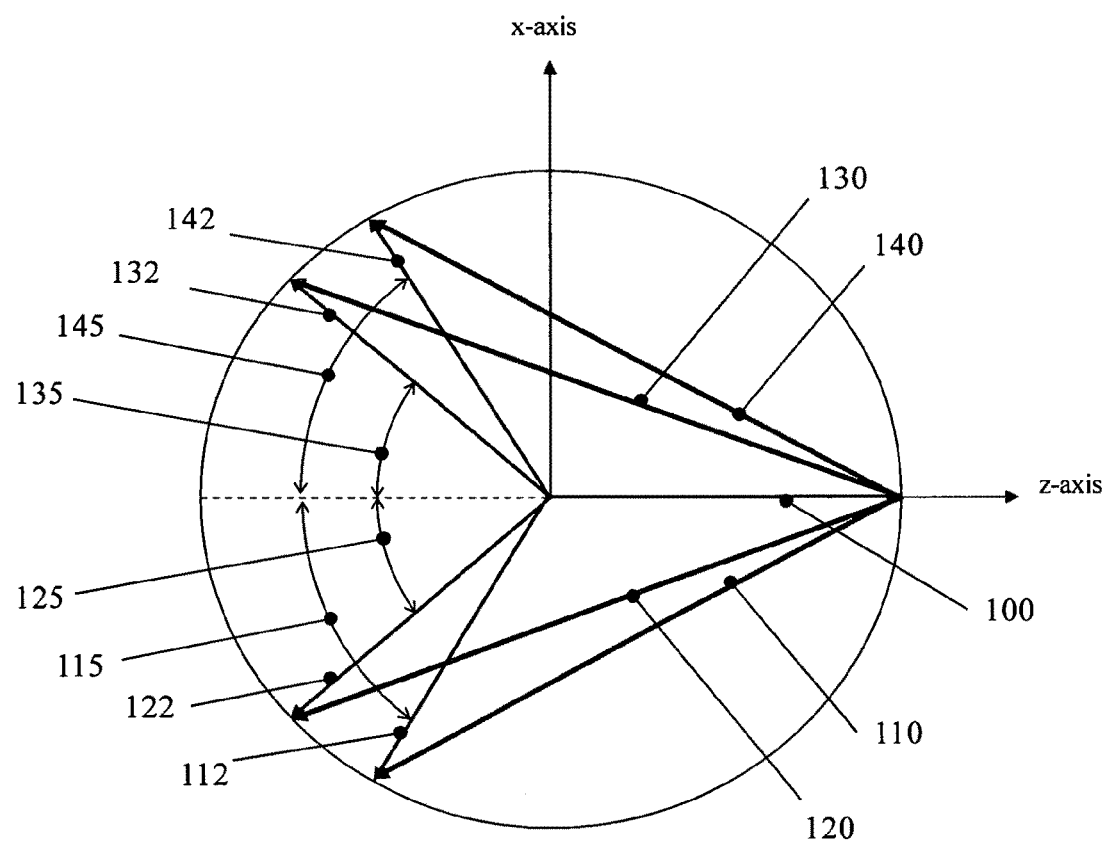
FIG. 1: Grating wave vector representation of four slanted reflective VHBF diffracting the same wavelength.

However, by varying the grating slant (the angle between the grating vector and the VHG surface normal) and the grating spacing, $\Lambda$ of each individual VHG in such a way that the same wavelength fulfills the Bragg condition for each VHG, the diffracted light from subsequent VHGs does not full fill the Bragg condition on any other grating. FIG. 1 illustrates an embodiment of the construction for a stack of four VHGs. The incident light beam 100 is represented in grating vector space. The grating vectors 110, 120, 130 and 140 each have a specific direction and amplitude and are represented in one plane for simplicity of the explanation. The diffracted beams 112, 122, 132 and 142 corresponding respectively to the four slanted VHGs diffract the same wavelength but propagate in different directions given respectively by the angles 115, 125, 135 and 145 and thus the diffracted beams do not interfere or re-diffract with the other gratings.

In one embodiment each VHG may be physically separated for example, but not limited to, spacers as FIG. 2A illustrates. In another embodiment each VHG maybe physically contacted for example, but not limited to, with an index matching epoxy as FIG. 2B illustrates. The invention is not limited to stacking three VHGs but rather the drawing in FIGS. 2A and 2B uses three VHBFs for simplicity. The number of VHGs comprising a VHBF is limited by the total transmission achievable.

Figure 3:
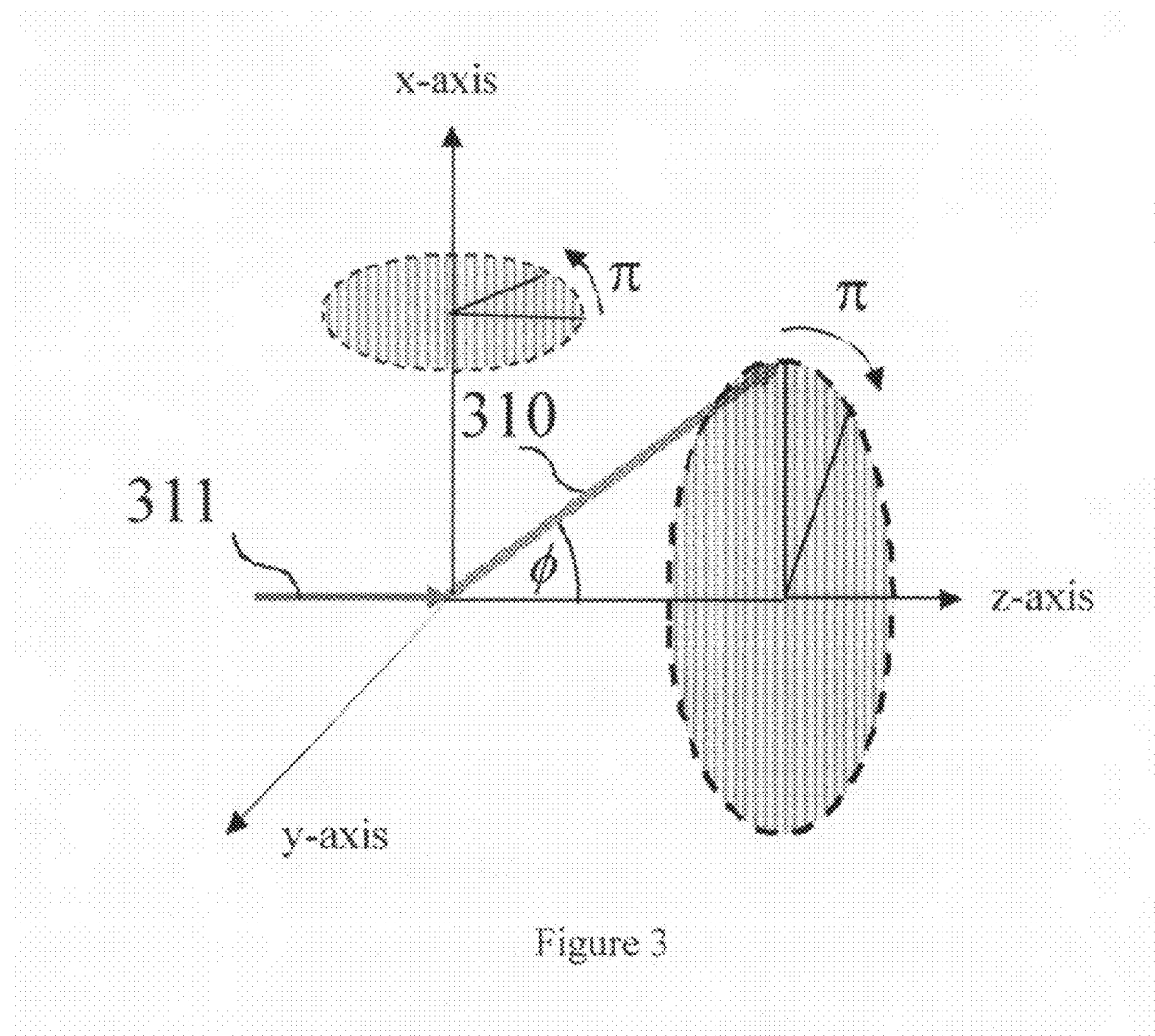
FIG. 3: Illustration for tuning the Bragg wavelength of each VHG in the VHBF assembly.

For the following analysis, we will assume that the collimated incident beam wave vector outside the material is parallel to the z-axis as FIG. 3 illustrates. The incident collimated beam 311 propagates in the direction of the z-axis: $\vec{k}_{air} = k_{air} \vec{e}_z$. We will allow a grating slant $\phi$ (angle between grating vector and surface normal) only in the x-z plane. We assume that the illumination is of single frequency. The laser wavelength is chosen slightly below the normal incidence wavelength of each VHG in the stack.

Following the illustration in FIG. 2, the first VHG is positioned with its grating vector $\vec{K}$ (310) in the x-z plane and rotated around the x-axis to fulfill the Bragg condition according to equation (1). the facet normal of the first VHG defines the incidence angle $\Theta_M$ of the entire stack with respect to the collimated illumination direction $\vec{k}_{air}$. The orientation of the facet normal of subsequent VHGs with respect to the incident beam, i.e. $\Theta_M$ are collinear with each other since we assume the VHG in the stack are in mechanical contact.

For the subsequent VHGs after the first one, fine wavelength tuning is achieved by rotating the VHG around its surface normal, the only degree of freedom left, by an angle $\omega$.

Using Snell's law the incident beam wave vector in the material is:

$$\vec{k} = k \begin{pmatrix} 0 \\ -\sin(\Theta_x - \Theta_M) \\ \cos(\Theta_x - \Theta_M) \end{pmatrix} \text{ with } \Theta_M = a\sin(\sin(\Theta_x)/n), \quad (2)$$

where $\Theta_x - \Theta_M$ is the angle between z-axis and $\vec{k}$ and $\Theta_M$ the angle between surface normal and $\vec{k}$ measured inside the medium. After rotation of the VHG around the x-axis by an angle $\Theta_x$, and around the surface normal by angle $\omega$, the VHG's grating vector $\vec{K}$ is:

$$\vec{K} = K \begin{pmatrix} \cos(\omega)\sin(\phi) \\ \cos(\Theta_x)\sin(\omega)\sin(\phi) - \sin(\Theta_x)\cos(\phi) \\ \sin(\Theta_x)\sin(\omega)\sin(\phi) + \cos(\Theta_x)\cos(\phi) \end{pmatrix}. \quad (3)$$

Using $\cos(\Theta) = \vec{k} \cdot \vec{K}/(kK)$ and equation (3), we find the notch wavelength $\lambda_B$ as a function of the angles $\omega$ and $\Theta_M$:

$$\lambda_B = \lambda_o \cos(\phi)(\cos(\Theta_M) + \sin(\Theta_M)\sin(\omega)\tan(\phi)). \quad (4)$$

From equation (4), we observe that individual VHGs can be Bragg-matched to the required notch wavelength by adjusting the rotation angles $\omega_i$ for each grating $i = 2, \ldots, N$. The fine wavelength tuning is only possible when $\Theta_M, \phi_i > 0$.

Figure 4:
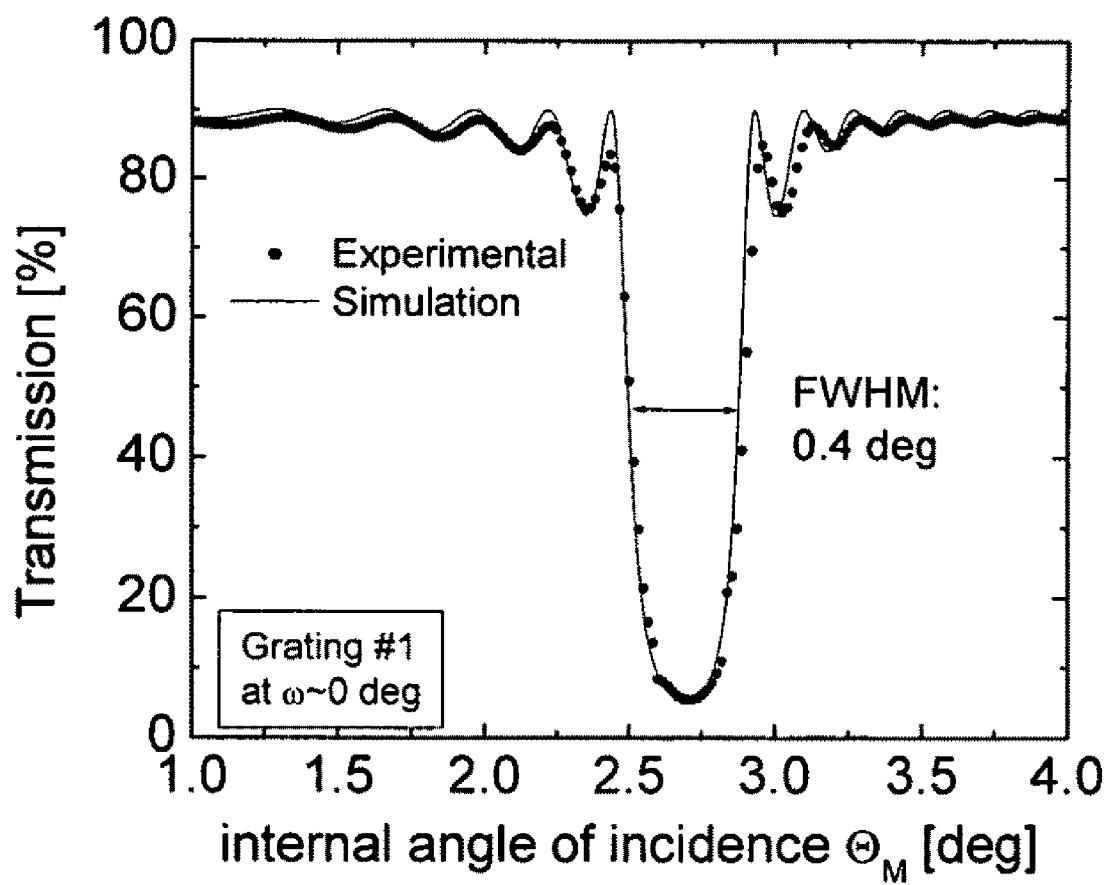
FIG. 4: Plot of a typical angular selectivity of one VHG in the VHBF stack.

A typical angular selectivity curve for an individual VHG is given in FIG. 4. The angular 3 dB bandwidth is 0.4 degrees. In another embodiment, the slant angle of each VHG is chosen such that the diffracted beams do not satisfy the Bragg condition for all other VHGs. From the measurement shown in FIG. 4, a value of at least 1 degree for the slant angle has been selected to satisfy that condition.

The rejection ratio of the VHBF assembly is the compounded rejection of each VHG in the stack when the alignment procedure outlined in the embodiments above is followed. This is justified because there are no coherent effects between the diffracted beams with the arrangement of the grating wave vector of each VHG described above. An example of spectral response of the notch filter with the VHBF assembly of one and three individual VHBF is shown respectively in FIGS. 5A and 5B.

We prepared six individual reflection VHGs with thickness of 1.6 mm and diffraction efficiencies near 90% (corresponding to optical density near unity). Anti-parallel diffraction wavelength and slant angles are given in table 1.

In one embodiment, each of the successive five VHGs is brought into direct mechanical contact to the previous VHG. After alignment, individual gratings are secured to the stack by an index matching epoxy. This procedure ensures that the internal incident angle $\Theta_M$ is the same for every grating in the stack. Only the rotation angle $\omega_i$ is used to fine tune the Bragg wavelength.

The laser used for the alignment is a wavelength locked semi-conductor laser diode at 785.0 nm, which is subsequently ASE filtered by a slanted reflection VHG. Grating #1 is aligned for Bragg diffraction with $\omega_i \approx 0$ and $\Theta_M = 2.7$ deg.

TABLE 1

Measured anti-parallel diffraction wavelength $\lambda_{o,i}$, slant angle $\phi_i$ and peak diffraction efficiency $\eta$ for 6 gratings. Also given is the normal incidence wavelength $\lambda_{o,i} \cos(\phi_i)$, which determines the tuning range of the final stack. The average normal incidence wavelength $\lambda_{o,i} \cos(\phi_i)$ is $(785.84 \pm 0.069)$ nm.

| VHG # | $\lambda_{o,i}$ [nm] | $\phi_i$ [deg] | $\lambda_{o,i} \cos(\phi_i)$ [nm] | $\eta$ [%] |
|---|---|---|---|---|
| 1 | 785.96 | +0.94 | 785.85 | 93 |
| 2 | 786.04 | −1.02 | 785.92 | 92 |
| 3 | 786.10 | +1.50 | 785.83 | 95 |
| 4 | 786.18 | −1.50 | 785.91 | 91 |
| 5 | 786.32 | +2.02 | 785.83 | 92 |
| 6 | 786.20 | −1.99 | 785.73 | 91 |

Now, let's determine what happens when the stack of bonded VHGs is wavelength tuned.

In another embodiment, wavelength tuning is performed by varying the incident angle from the initial alignment angle $\Theta_M$ to a new incident angle $\Theta_M + \Delta\Theta_M$. For all VHGs in the stack, the new notch wavelength will vary according to equation (4) and the difference in wavelength between any two gratings can be computed to be:

$$\Delta\lambda = (\lambda_{o,1}\cos(\phi_1) - \lambda_{o,2}\cos(\phi_2))\frac{\sin(\Delta\Theta_M)}{\sin(\Theta_M)}. \quad (5)$$

Note that the wavelength shift between any two gratings does not depend on the rotation terms $\omega_i$. This is due to the constraint that at the alignment angle $\Theta_M$ of the stack, the wavelength shift $\Delta\lambda$ is equal to zero.

Table 1 gives a standard deviation of 0.069 nm for the quantity $(\lambda_{o,i} \cos(\phi_i) - \lambda_{o,j} \cos(\phi_j))$.

Figure 6B:
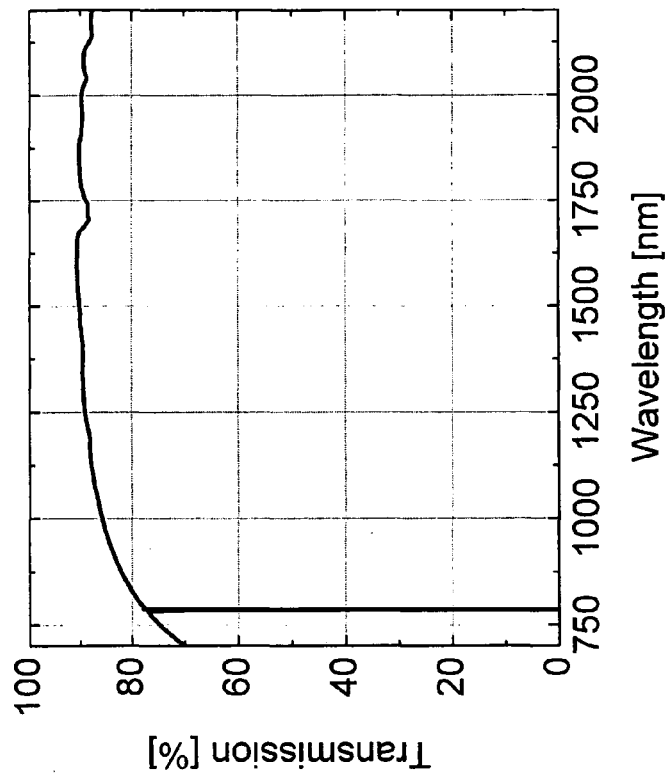
FIG. 6A, 6B: Plot showing wavelength tuning of the VHBF assembly and spectral transmission between 700 and 1000 nm.
Figure 6A:
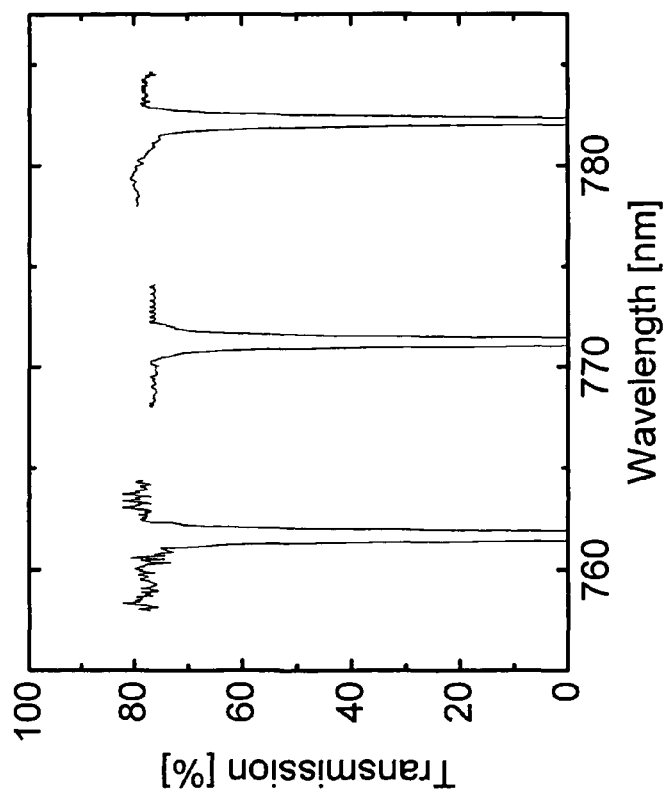

The stack of six VHGs was aligned at a value for $\Theta_M$ of 2.7 degrees and tuned by $\Delta\Theta_M$ of 11.4 degrees (these are values inside the material of index n=1.5). According to equation 5, we expect to observe a broadening of the overall bandwidth by 0.29 nm. The experimental result is shown in FIG. 6A. As expected, the 6-stack wavelength blocker maintains a single transmission notch at all tuning angles. The measured spectral bandwidth broadening is half the computed value (0.14 nm vs. 0.29 nm).

Light transmission of the six-stack wavelength blocker is measured by a CARY 500 spectrometer. The transmission measurement in FIG. 6B shows that the 9.6 mm thick filter stack (6 times 1.6 mm) transmits greater than 80% of the incident light outside the notch. The first and last VHG facets are without anti-reflection (AR) coatings. An additional 8% transmission could be gained by adding an AR coating to the outside facet of the first and last VHG in the stack.

Figure 7B:
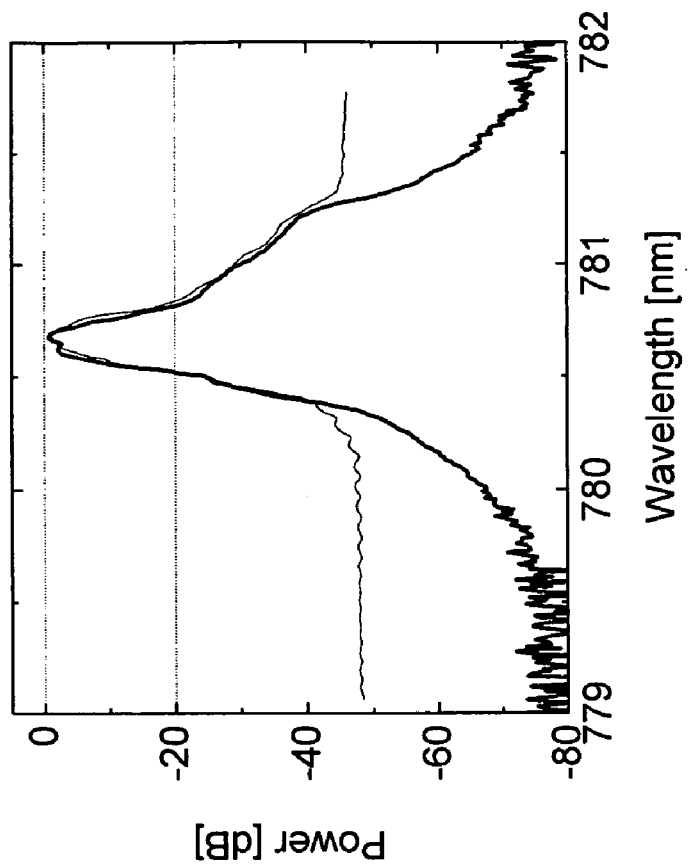
FIG. 7A, 7B: Illustration of an ASE filtered laser source and a plot of an ASE suppressed laser diode spectrum.
Figure 7A:
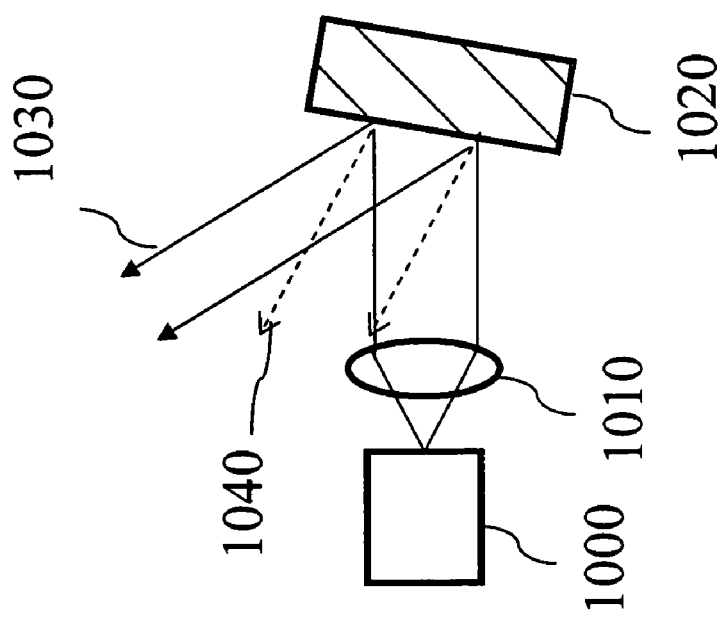

In another embodiment, the Raman excitation laser light source is a laser whose amplified spontaneous emission is filtered as illustrated in FIG. 7A. A laser light source 1000 is collimated by collimating assembly 1010. A slanted reflective VHG is positioned to receive the collimated beam. The diffracted beam 1030 is the ASE filtered beam. The specularly reflected light beam 1040 is propagating in a different direction. In other embodiments, more than one ASE filter can be used to further reduce the ASE content of the laser.

FIG. 7B shows the spectrum of the unfiltered and filtered laser diode measured with an ANDO double spectrometer with 0.05 rim resolution. We observe that the ASE of the original laser diode is drastically reduced. The spectrometer distorts and broadens the actual ASE filtered spectrum due to stray light inside the spectrometer. The optical density of the fabricated stack is measured at 780.7 nm with an ASE filtered single frequency laser light source.

Figure 8:
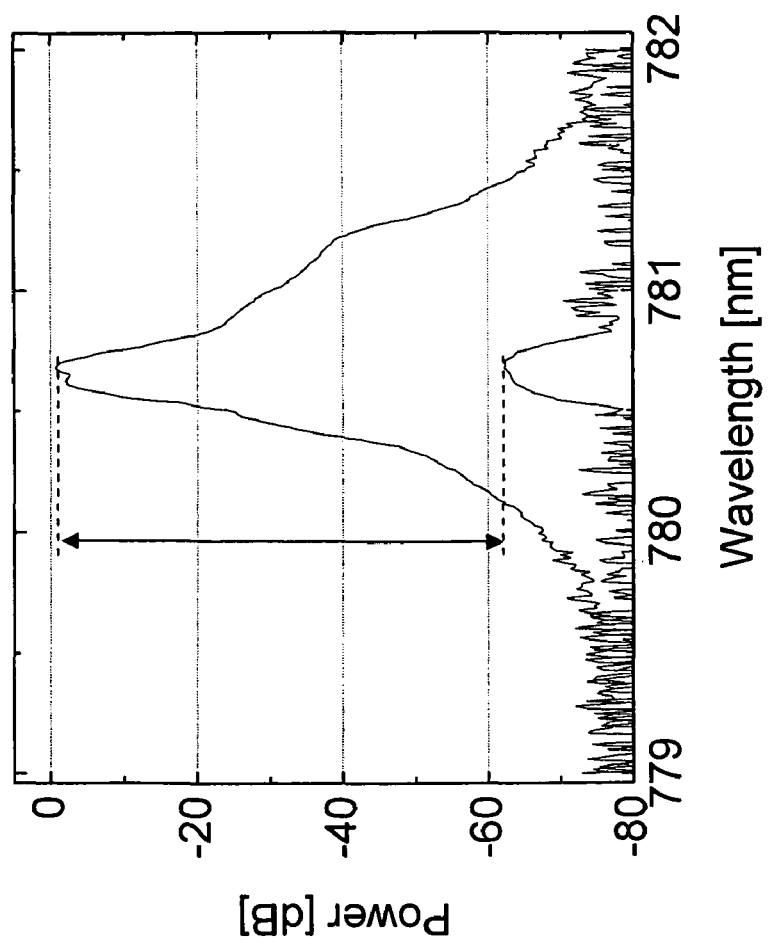
FIG. 8: Plot showing the optical density of 6 achieved with a VHBF assembly of 6 VHGs.

The collimated light beam of dimension 1 mm×2 mm is incident on the wavelength blocker. The transmitted light is fiber coupled to a multimode fiber and sent to the spectrometer. The result is shown in FIG. 8. An attenuation of the laser power of 60 dB, corresponding to an optical density of 6, is achieved. The stack was assembled at a wavelength of 785.1 nm. We have shown that after tuning the stack by 5 nm, an optical density of 6 was maintained.

Figure 9:
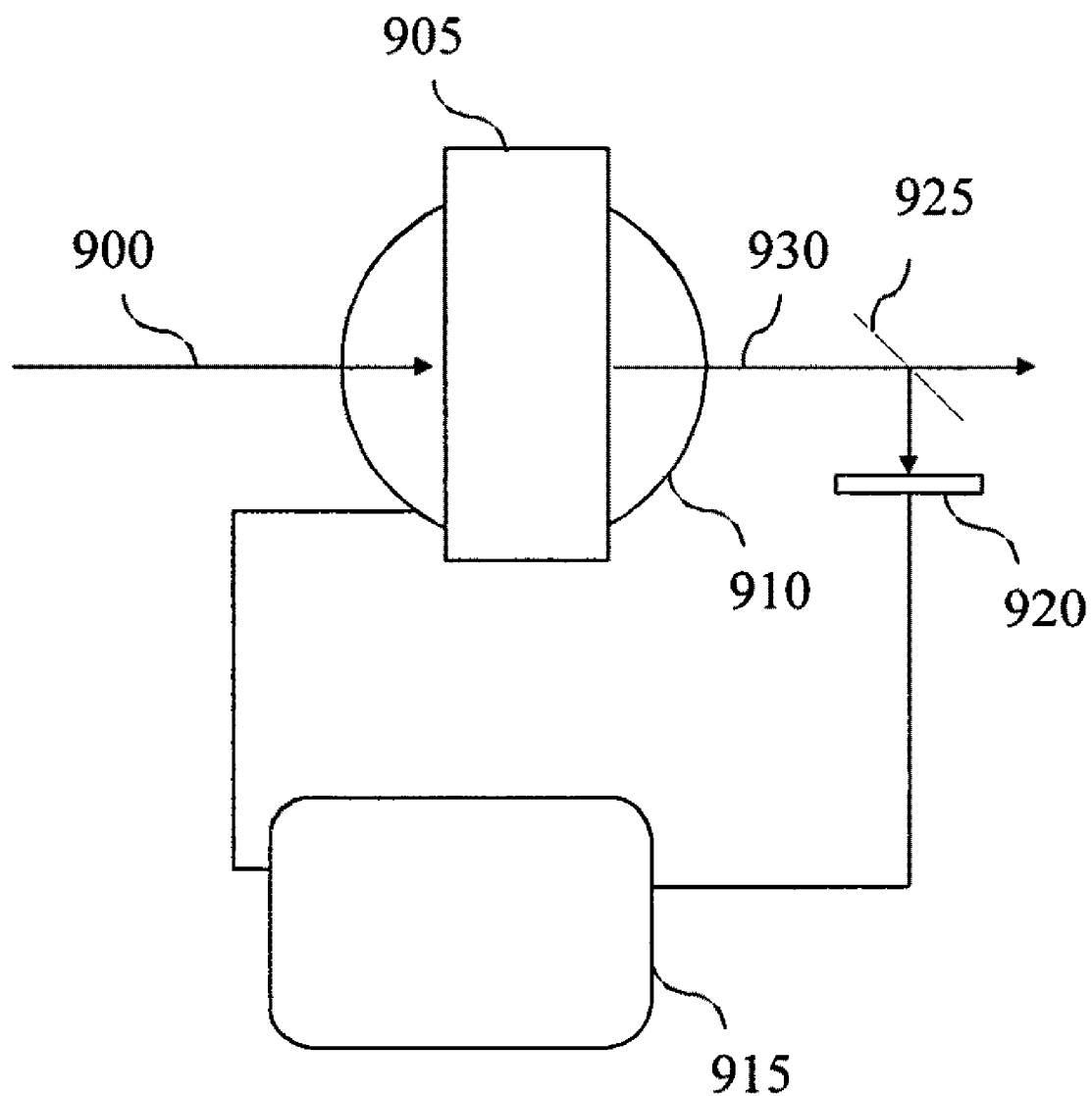
FIG. 9: Illustration of a feedback loop for the keep the VHBF assembly aligned to the laser frequency for maintaining maximum optical density.

Another embodiment in the invention is a means to angularly tune the VHBF assembly so that the Bragg wavelength of the VHBF always tracks the wavelength of the excitation laser in order to obtain maximum optical density (maximum rejection of the excitation light). An example of a tuning mechanism consists of positioning the VHBF on a rotation stage and rotating the stage. A detector is added to receive a portion of the attenuated pump after the VHBF assembly. The signal can be used as feedback to the tuning mechanism. FIG. 9 illustrates the tuning and feedback mechanism. The VHBF 905 is placed on the rotation stage 910. The collimated signal 900 is incident on the VHBF 905. A fraction of the transmitted beam 930 is deflected by the beam-splitter 925 and directed to a photodetector 920. The electrical signal is processed by a computer or microprocessor 915 and a feedback signal is sent to the rotation stage to minimize to photodetected power.

Figure 10:
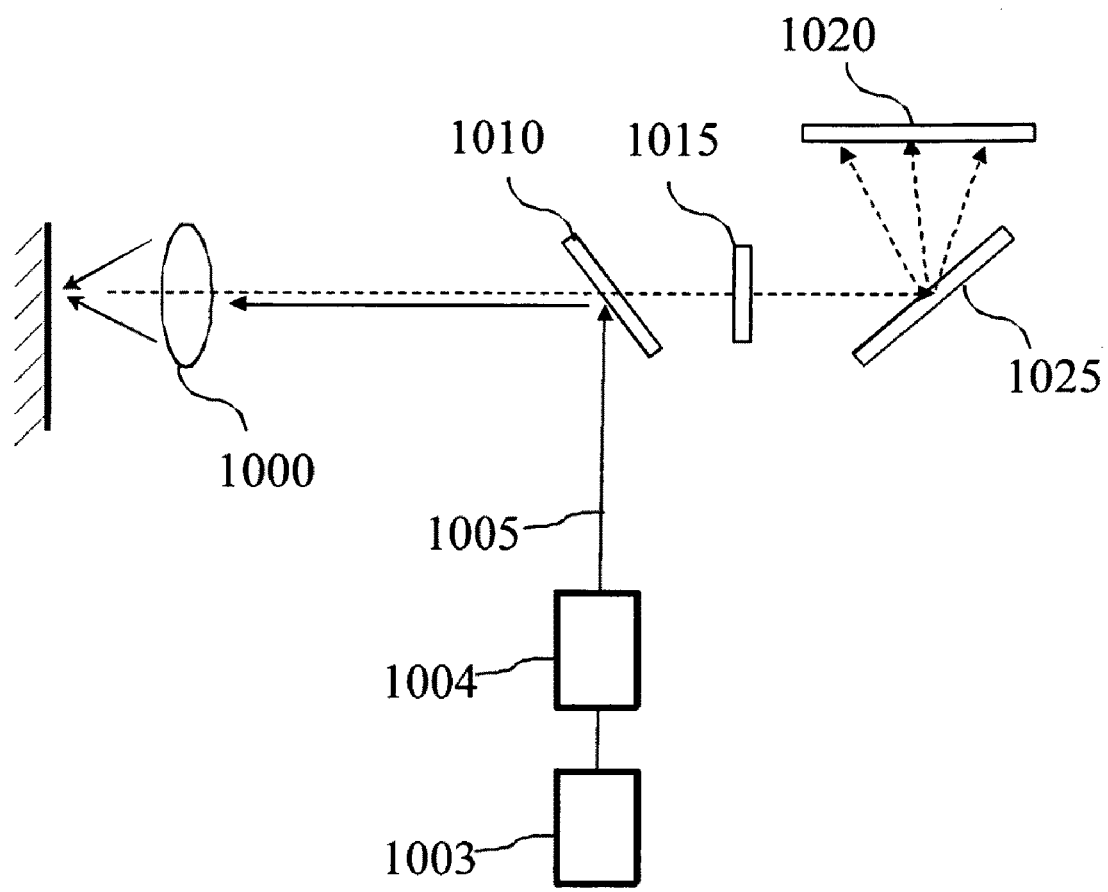
FIG. 10: Illustration of a Raman apparatus using a VHBF assembly and an ASE suppressed laser excitation source.

Another embodiment is an apparatus that uses the VHBF assembly of the embodiments above as illustrated by FIG. 10. A laser source 1003 is collimated and ASE filtered by the assembly 1004. The ASE filtered beam 1005 is reflected by a dichroic beam-splitter 1010 towards a lens assembly 1000 that focuses the laser beam onto a sample under examination. The dichroic beam-splitter reflects the laser beam and is transparent to other wavelength. In yet another embodiment, the dichroic beam-splitter may be a reflective or transmissive VHG or any other type of narrowband filter. The signal beam generated from the sample as a result of the excitation laser beam (fluorescence, Raman) as well as the backscattering of the laser is recollimated by the same lens assembly 1000. The signal is transmitted through the dichroic beam-splitter 1010 and incident on the VHBF assembly 1015 that may also include the tuning assembly disclosed in the embodiment above. Further spatial beam filters maybe incorporated in the path of the signal beam to perform a confocal system. After the VHBF assembly, the laser light is rejected and the Raman, fluorescence or any other signal generated by the excitation laser impinges on a dispersive element 1025 such as but not limited to a diffraction grating. The spectrally dispersed signal is then received by an array of photodector 1020. The array of photodetectors can be one or two dimensional.

In another embodiment, many of the discrete functions that comprise a standard Raman or fluorescence system, such as laser, ASE filtering, dichroic beam-splitters and wavelength blocker are integrated in a single holographic glass wafer.

Figure 11:
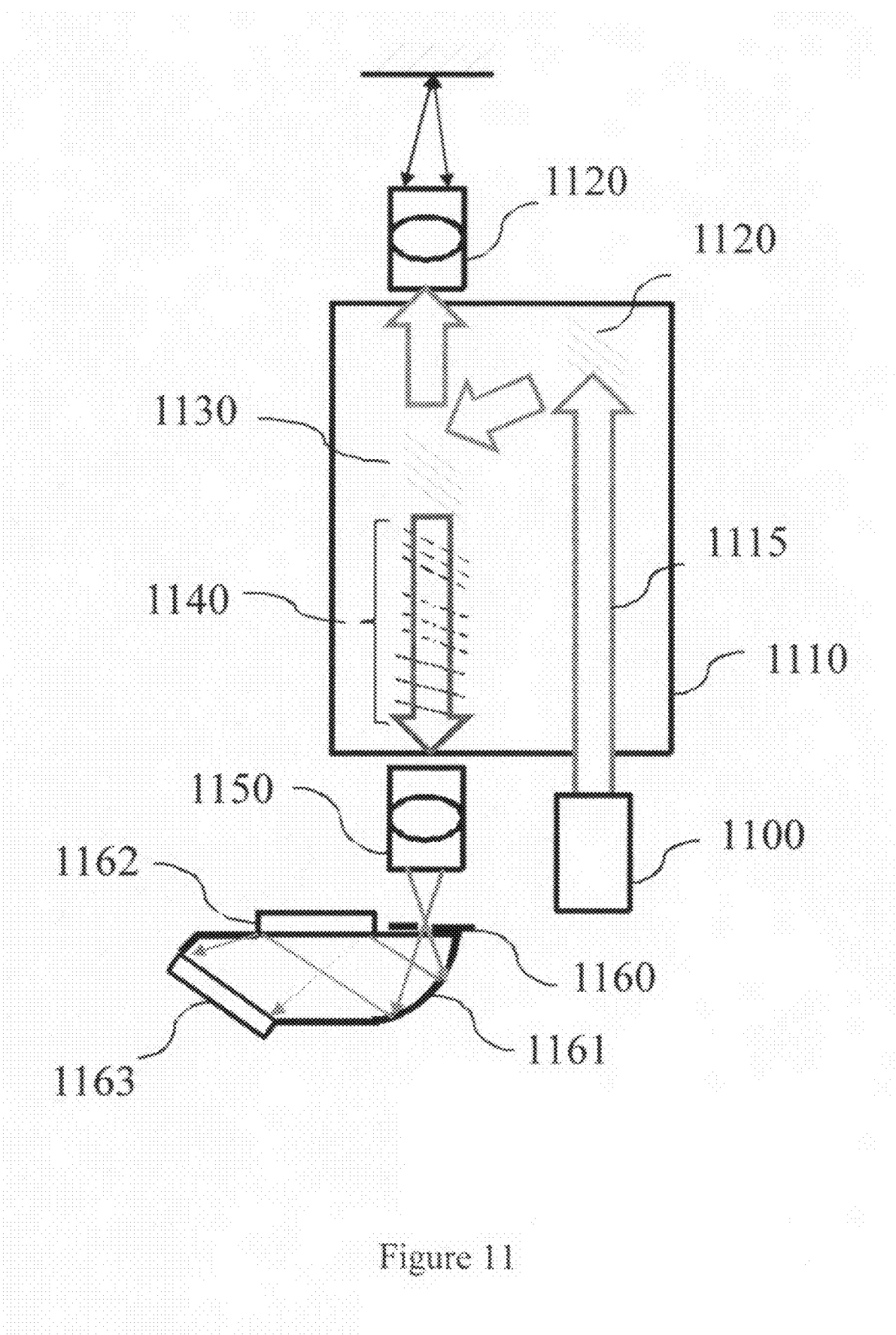
FIG. 11: Illustration of a Raman spectrometer incorporating the ASE function, the blocker function, the dichroic filter function in one glass holographic wafer.

FIG. 11 illustrates the embodiment. A laser diode 1100 is collimated to produce collimated beam 1115 which is directed to the entrance facet of a holographic glass wafer 1110. A grating 1120, recorded holographically using a transmission geometry, filters the beam 1115 and directs it to an identical grating 1130, also recorded holographically using a transmission geometry. The role of the grating 1130 is of an ASE filter and dichroic beam-splitter. The ASE filtered beam is then brought to a focus by a lens assembly 1120. The wavelength blocker is a cascade of VHGs 1140 whose grating vector amplitude and direction are designed to diffract the same wavelength. The VHGs 1140 are recorded holographically with the transmission geometry. The wavelength blocker attenuates the backscattered laser excitation light. The dimension of the holographic wafer is approximately 10 mm by 15 mm and comprises three distinct functions: ASE filtering, dichroic beam-splitter and wavelength blocker.

After the wavelength blocker a lens assembly 1150 is used in conjunction with an aperture 1160 to perform confocal measurements. The lens assembly 1150 can be, but is not limited to, a cylindrical lens. A compact spectrometer is built in one glass block, which has a cylindrical surface 1161 to collimated the signal to direct it to a dispersive grating 1162. The spectrally dispersed signal is then capture by an array of photodetectors 1163.

Figure 12:
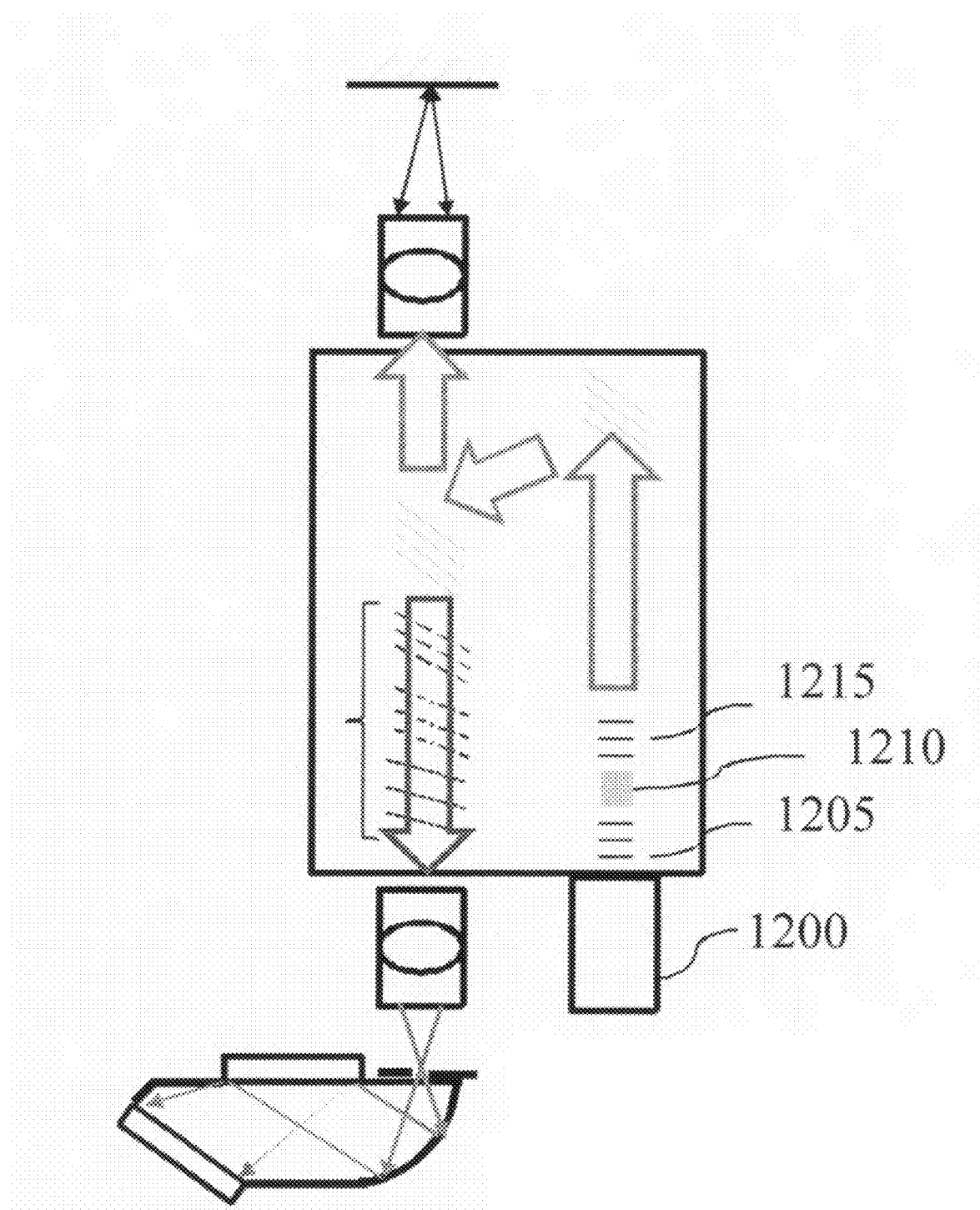
FIG. 12: Same as FIG. 11 except that the laser is incorporated in the doped holographic wafer.

In another embodiment illustrated in FIG. 12, the laser 1200 is used to pump a doped glass region 1210 (for example but not limited to Neodimium) which is surrounded by two holographically written reflective VHGs that serve as resonators to amplify the doped glass region and provide laser light.

The invention claimed is:

1. A volume holographic wavelength blocking filter assembly comprising:
a plurality of reflective volume holographic gratings, each reflective volume holographic grating having
a distinct slant angle;
a distinct grating spacing,
wherein the plurality of reflective volume holographic gratings produce a filtered Raman signal when disposed in a path of a Raman signal.

2. The volume holographic wavelength blocking filter assembly of claim 1, wherein the plurality of reflective volume holographic gratings have an optical density of at least four at the Bragg wavelength.

3. The volume holographic wavelength blocking filter assembly of claim 1, wherein the plurality of reflective volume holographic gratings are bonded with an index matching epoxy.

4. The volume holographic wavelength blocking filter assembly of claim 1, wherein the plurality of reflective volume holographic gratings are separated by spacers and bonded at the edges.

5. The volume holographic wavelength blocking filter assembly of claim 1, wherein the product of the cosine of the slant angle and the grating spacing for each reflective volume holographic grating forming the stack is substantially equal.

6. The volume holographic wavelength blocking filter assembly of claim 1, wherein each reflective volume holographic grating is successively aligned by a first rotation of a common angle with respect to a collimated single frequency laser beam and a second rotation around the surface normal of each reflective VHG by an angle such as to maximize the optical density at the common Bragg wavelength.

7. The volume holographic wavelength blocking filter assembly of claim 1, wherein the blocking wavelength is tuned by rotation.

8. The volume holographic wavelength blocking filter assembly of claim 1, wherein the holographic material is made of photosensitive glass.

9. The volume holographic wavelength blocking filter assembly of claim 8, wherein the photosensitive glass comprises at least one compound selected from the group consisting of silicon oxide, aluminum oxide and zinc oxide.

10. The volume holographic wavelength blocking filter assembly of claim 9, wherein the photosensitive glass further comprises an alkali oxide, fluorine, silver and at least one compound selected from the group consisting of chlorine, bromine, and iodine.

11. The volume holographic wavelength blocking filter assembly of claim 10, wherein the photosensitive glass further comprises cerium oxide.

12. An apparatus for Raman spectroscopy, the apparatus comprising:
a laser whose amplified spontaneous emission is filtered by one or more reflective volume holographic grating elements and directed to a physical matter to stimulate Raman scattering, thereby producing a Raman signal;
at least one volume holographic wavelength blocking filter assembly disposed in the path of the Raman signal for removing Rayleigh scattering from the Raman signal to produce a filtered Raman signal, the volume holographic wavelength blocking filter assembly comprising a plurality of reflective volume holographic gratings, each reflective volume holographic grating having a distinct slant angle and distinct grating spacing;
an optical spectrometer disposed in the path of the filtered Raman signal for measuring a spectrum of the Raman signal and for generating a detection signal; and
a microprocessor connected to receive the detection signal for determining properties of the physical matter from the detection signal.

13. The apparatus of claim 12, further comprising:
a rotation device, wherein the volume holographic wavelength blocking filter assembly is placed on the rotation device;
a beam-splitter positioned in the path of the filtered Raman signal to sample a portion of the beam; and
a photodetector, wherein the sampled portion of the beam is detected by the photodetector and wherein a signal is generated to create a feedback mechanism to tune the Bragg wavelength of the volume holographic wavelength blocking filter assembly by acting on the rotation device so as to maximize the optical density at the Rayleigh wavelength.

14. An apparatus for Raman spectroscopy, the apparatus comprising:
a laser for generating an amplified spontaneous emission;
a photosensitive glass wafer comprising:
at least one reflective volume holographic grating for filtering the amplified spontaneous emission from the laser directed to a physical matter to stimulate Raman scattering, thereby producing a Raman signal that propagates back through the reflective volume holographic grating, and
a plurality of reflective spatially non-overlapping volume holographic gratings, each reflective volume holographic grating having a distinct slant angle and a distinct grating spacing, disposed in a path of the Raman signal for removing Rayleigh scattering from the Raman signal to produce a filtered Raman signal;
an optical spectrometer disposed in the path of the filtered Raman signal for measuring the spectrum of the Raman signal and for generating a detection signal; and a microprocessor coupled to the optical spectrometer and configured to:
  receive the detection signal, and
  determine properties of the physical matter from the detection signal.

15. The apparatus of claim 14, wherein the photosensitive glass wafer at includes least one compound selected from the group consisting of silicon oxide, aluminum oxide, and zinc oxide.

16. The apparatus of claim 15, wherein the photosensitive glass further includes an alkali oxide, fluorine, silver and at least one compound selected from the group consisting of chlorine, bromine, and iodine.

17. The apparatus of claim 16, wherein the photosensitive glass further includes cerium oxide.

18. An apparatus for Raman spectroscopy, the apparatus comprising:
  a pump laser for generating amplified stimulated emission light;
  a photosensitive glass wafer comprising:
    a doped region surrounded by a pair of reflective high efficiency volume holographic gratings, the pair forming a resonant cavity for receiving light from the pump laser,
    at least one reflective volume holographic grating for directing the amplified stimulated emission light to a physical matter to stimulate Raman scattering, thereby producing a Raman signal that propagates back through the reflective volume holographic grating, and
    a plurality of reflective spatially non-overlapping volume holographic gratings, each having a distinct slant angle and a distinct grating spacing, the plurality of reflective spatially non-overlapping volume holographic gratings disposed in the path of the Raman signal for removing Rayleigh scattering from the Raman signal to produce a filtered Raman signal;
  an optical spectrometer disposed in the path of the filtered Raman signal for measuring the spectrum of the Raman signal and for generating a detection signal; and
  a microprocessor coupled to the optical spectrometer and configured to receive the detection signal for determining properties of the physical matter from the detection signal.

* * * * *